United States Patent
Ishikawa et al.

(10) Patent No.: US 7,649,335 B2
(45) Date of Patent: Jan. 19, 2010

(54) VEHICULAR POWER SUPPLY SYSTEM AND VEHICLE

(75) Inventors: Tetsuhiro Ishikawa, Nishikamo-gun (JP); Takaya Soma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 391 days.

(21) Appl. No.: 11/792,506

(22) PCT Filed: May 2, 2006

(86) PCT No.: PCT/JP2006/309529

§ 371 (c)(1),
(2), (4) Date: Jun. 7, 2007

(87) PCT Pub. No.: WO2006/132052

PCT Pub. Date: Dec. 14, 2006

(65) Prior Publication Data

US 2008/0197810 A1    Aug. 21, 2008

(30) Foreign Application Priority Data

Jun. 7, 2005    (JP) .............................. 2005-167214

(51) Int. Cl.
*H01M 10/46* (2006.01)
(52) U.S. Cl. .................................... 320/104
(58) Field of Classification Search ................. 320/104, 320/127, 135, 140, 166, 167; 180/65.29, 180/65.31; 318/454, 800
See application file for complete search history.

(56) References Cited

U.S. PATENT DOCUMENTS 4,322,787 A * 3/1982 Kraus ......................... 323/222
5,945,806 A    8/1999 Faulk
6,107,788 A    8/2000 Oya et al.
6,232,749 B1  5/2001 Hewes et al.
6,917,179 B2 * 7/2005 Komatsu et al. ............ 318/700
2006/0207813 A1 * 9/2006 Ishikawa et al. ........... 180/65.4

FOREIGN PATENT DOCUMENTS

| GB | 2 340 678 | 2/2000 |
|---|---|---|
| JP | A 10-224987 | 8/1998 |
| JP | A 2002-78230 | 3/2002 |
| JP | A 2003-143713 | 5/2003 |
| JP | A 2003-164075 | 6/2003 |
| JP | A 2004-72892 | 3/2004 |
| JP | A 2005-62908 | 3/2005 |
| JP | A 2005-79080 | 3/2005 |
| WO | WO 03/099605 A1 | 12/2003 |

* cited by examiner

*Primary Examiner*—Edward Tso
(74) *Attorney, Agent, or Firm*—Oliff & Berridge, PLC (57) ABSTRACT

A vehicular power system includes: a secondary battery; an up-converter receiving a voltage of the secondary battery at a first connection node thereof, and up-converting a voltage between terminals of the secondary battery and outputting the up-converted voltage at a second connection node thereof; system main relays switching between connection and disconnection of the voltage up-converted by the up-converter to and from a load of a vehicle; and a case housing the secondary battery, the up-converter and the system main relays. Preferably the vehicular power supply system further includes a capacitor having one end connected to the second connection node of the up-converter and the case further houses the capacitor. Preferably the capacitor includes a plurality of series connected, electric dual layer capacitors. A vehicular power supply system suitable for being mounted in a vehicle and miniaturized, and a vehicle having the system mounted therein, can thus be provided.

13 Claims, 6 Drawing Sheets

VEHICULAR POWER SUPPLY SYSTEM AND VEHICLE

TECHNICAL FIELD

The present invention relates generally to vehicular power supply systems and vehicles equipped therewith and particularly to vehicular power supply systems including a high-voltage direct current (DC) power supply and vehicles equipped therewith.

BACKGROUND ART

In recent years, hybrid vehicles, electric vehicles and fuel cell vehicles have gained significant attention as environmentally friendly vehicles.

A hybrid vehicle has, as a power source, a conventional engine and in addition thereto a DC power supply, an inverter and a motor driven by the inverter. More specifically, the engine is driven to obtain power and the DC power supply also provides DC voltage which is in turn converted by the inverter to alternate current (AC) voltage employed to rotate the motor to obtain power. For such vehicle a plurality of components are housed in a single case to miniaturize a power supply system supplying DC power.

Japanese Patent Laying-Open No. 2002-078230 discloses a portable power supply device compact and enhanced in portability. This portable power supply device allows a solar cell-equipped portable hybrid power supply system to have a secondary battery, an electric dual layer capacitor, and a DC-DC converter integrated together for miniaturization.

Japanese Patent Laying-Open No. 2002-078230 discloses a low-voltage, portable hybrid power supply, and there is room for improvement in miniaturizing a vehicular power supply system that utilizes high voltage.

When passive safety is considered, it is important that a vehicular power supply device has its power supply unit housed in a single case and thus packed in one. More specifically, it is necessary to have a high voltage power storage device with a high voltage portion packed in one so that in a collision, positive and negative high voltage cables are disconnected at a relay from the high voltage portion.

DISCLOSURE OF THE INVENTION

The present invention contemplates a vehicular power supply system that is suitable for being mounted in vehicles and is miniaturized, and a vehicle having the same mounted therein.

In summary the present invention provides a vehicular power system including: a secondary battery; a voltage converter receiving a voltage of the secondary battery at a first connection node thereof, and up-converting a voltage between terminals of the secondary battery and outputting the up-converted voltage at a second connection node thereof, a connection unit switching between connection and disconnection of the voltage up-converted by the voltage converter to and from a load of a vehicle; and a case housing the secondary battery, the voltage converter and the connection unit.

Preferably the vehicular power supply system further includes a capacitor having one end connected to the second connection node of the voltage converter and the case further houses the capacitor.

Preferably the capacitor includes a plurality of series connected, electric dual layer capacitors.

Preferably the voltage converter includes a reactor and a switching device connected in series on a path extending from the first connection node to the second connection node.

Preferably the vehicular power supply system further includes a smoothing capacitor connected between the terminals of the secondary battery and the case further houses the smoothing capacitor.

Preferably the vehicular power supply system further includes a first terminal provided at the case and connected to a first electrically conductive line for supplying the load of the vehicle with electric power, and a second terminal provided at the case and connected to a second electrically conductive line serving as a return line of the first electrically conductive line, and the connection unit includes a first relay circuit connecting a second node of the voltage converter to the first terminal, and a second relay circuit connecting a ground node of the voltage converter to the second terminal.

The present invention in another aspect provides a vehicle including the above described vehicular power supply system, a load of the vehicle supplied with power from the vehicular power supply system, and a power cable connecting the vehicular power supply system and the load of the vehicle together.

Preferably the vehicular power supply system is arranged in one of a space located in front of a driver's seat and a space located behind the driver's seat. The load of the vehicle is arranged in the other of the spaces located in front of and behind the driver's seat. The power cable extends between the spaces in front of and behind the driver's seat.

The present invention can thus implement a vehicular power supply system miniaturized and having a reduced number of components.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart of a sequence of controlling system main relays when vehicle 100 of FIG. 1 is powered on.

BEST MODES FOR CARRYING OUT THE INVENTION

Hereinafter the present invention in embodiments will be described more specifically with reference to the drawings. In the figures, the same or corresponding portions are denoted by the same reference characters and the description thereof will note be repeated.

A hybrid vehicle can run with the engine stopped and the motor alone operated, or run as an electric vehicle. If the vehicle running as an electric vehicle is rapidly accelerated to overtake another vehicle, the battery is required to output increased power to rapidly rotate a motor for driving wheels, and if despite that the vehicle is insufficiently accelerated, the engine can be started to add a torque of the engine as that which rotates the wheels.

Figure 1:
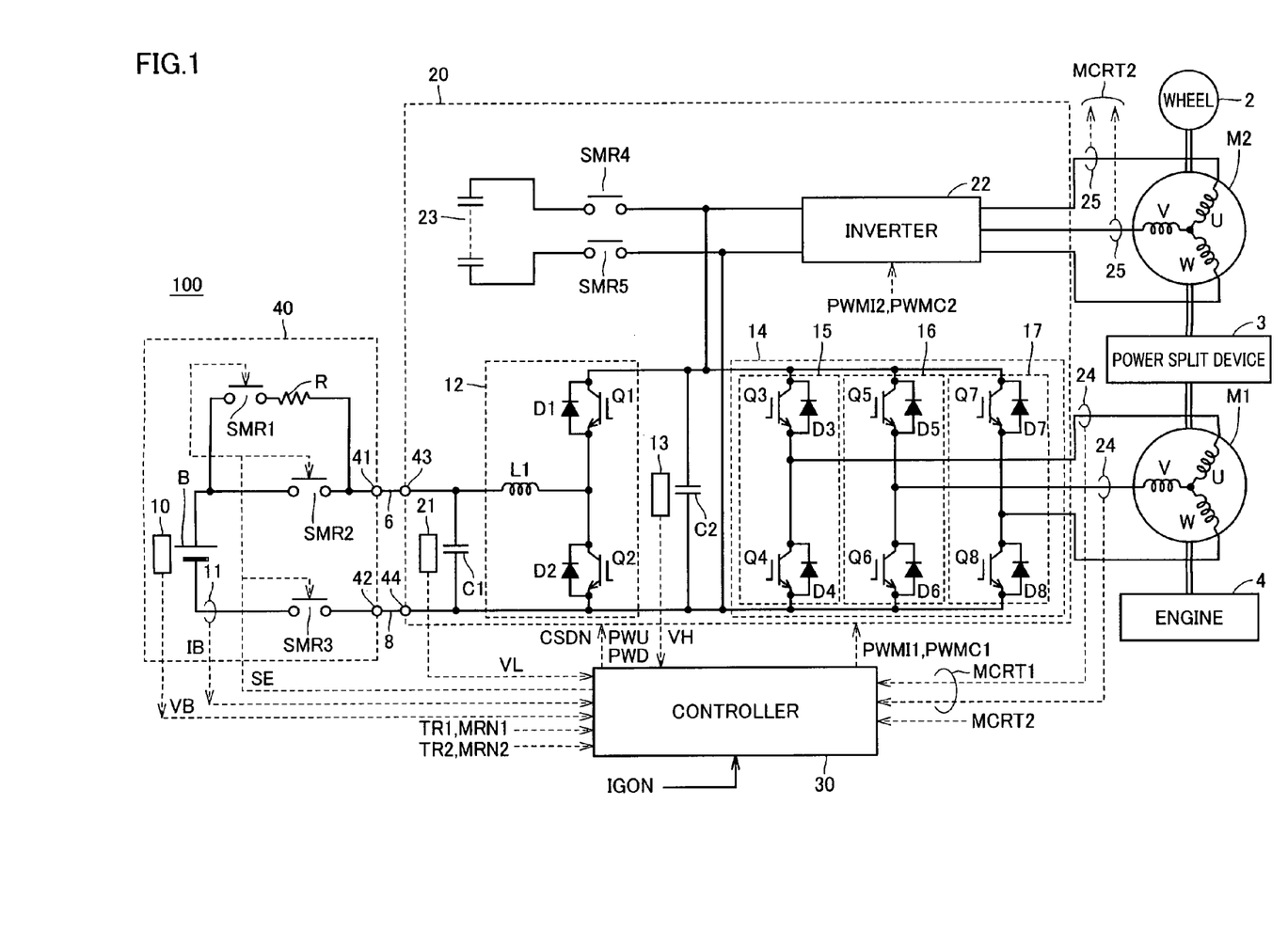
FIG. 1 is a circuit diagram showing an example considering mounting a capacitor in a vehicle.

FIG. 1 is a circuit diagram showing an example considering mounting a capacitor in a vehicle.

With reference to FIG. 1, a vehicle 100 includes a battery unit 40, a power control unit 20, an engine 4, motor generators M1 and M2, a power split device 3, a wheel 2, and a controller 30.

Power split device 3 is coupled with engine 4 and motor generators M1 and M2 to split power therebetween. For example the power split device can be a planetary gear mechanism having three rotation shafts of a sun gear, a planetary carrier and a ring gear. The three rotation shafts are connected to the rotation shafts of engine 4 and motor generators M1 and M2, respectively. Note that motor generator M2 has its rotation shaft coupled with wheel 2 by a reduction gear, a differential gear or the like (not shown). Furthermore, power split device 3 may internally have a speed reducer incorporated therein for the rotation shaft of motor generator M2.

Battery unit 40 is provided with terminals 41 and 42. Furthermore power control unit 20 is provided with terminals 43 and 44. Vehicle 100 also includes a power cable 6 connecting terminals 41 and 43 together, and a power cable 8 connecting terminals 42 and 44 together.

Battery unit 40 includes a battery B, a system main relay SMR3 connected between a negative electrode of battery B and terminal 42, a system main relay SMR2 connected between a positive electrode of battery B and terminal 41, and a system main relay SMR1 and a current-limiting resistor R connected in series between the positive electrode of battery B and terminal 41. System main relays SMR1-SMR3 are controlled in response to a control signal SE applied from controller 30 to electrically connect/disconnect.

Battery unit 40 further includes a voltage sensor 10 measuring a voltage VB between the terminals of battery B, and a current sensor 11 detecting a current IB flowing through battery B.

Battery B can for example be a nickel metal hydride, lithium ion, or similar secondary or fuel cell, or the like.

Power control unit 20 includes a smoothing capacitor C1 connected between terminals 43 and 44, a voltage sensor 21 detecting a voltage VL between terminals of smoothing capacitor C1 for output to controller 30, an up-converter 12 up-converting the voltage between the terminals of smoothing capacitor C1, a smoothing capacitor C2 smoothing the voltage up-converted by up-converter 12, a voltage sensor 13 detecting a voltage VH between terminals of smoothing capacitor C2 for output to controller 30, and an inverter 14 receiving a DC voltage from up-converter 12, converting the received DC voltage to a 3-phase AC current, and outputting the current to motor generator M1.

Up-converter 12 includes a reactor L1 having one end connected to terminal 43, IGBT devices Q1 and Q2 connected in series between output terminals of up-converter 12 outputting voltage VH, and diodes D1 and D2 connected in parallel with IGBT devices Q1 and Q2, respectively.

Reactor L1 has the other end connected to an emitter of IGBT device Q1 and to a collector of IGBT device Q2. Diode D1 has a cathode connected to a collector of IGBT device Q1, and an anode connected to the emitter of IGBT device Q1. Diode D2 has a cathode connected to the collector of IGBT device Q2, and an anode connected to an emitter of IGBT device Q2.

Inverter 14 receives voltage up-converted by up-converter 12 and for example drives motor generator M1 to start engine 4. Furthermore, inverter 14 returns, to up-converter 12, the power generated by motor generator M1 with power transmitted from engine 4. In doing so, up-converter 12 is controlled by controller 30 to operate as a down conversion circuit.

Inverter 14 includes a U-phase arm 15, a V-phase arm 16, and a W-phase arm 17, which are connected in parallel between output lines of converter 12.

U-phase arm 15 includes series connected IGBT devices Q3 and Q4, and diodes D3 and D4 connected parallel to IGBT devices Q3 and Q4, respectively. Diode D3 has a cathode connected to a collector of IGBT device Q3, and an anode connected to an emitter of IGBT device Q3. Diode D4 has a cathode connected to a collector of IGBT device Q4, and an anode connected to an emitter of IGBT device Q4.

V-phase arm 16 includes series connected IGBT devices Q5 and Q6, and diodes D5 and D6 connected parallel to IGBT devices Q5 and Q6, respectively. Diode D5 has a cathode connected to a collector of IGBT device Q5, and an anode connected to an emitter of IGBT device Q5. Diode D6 has a cathode connected to a collector of IGBT device Q6, and an anode connected to an emitter of IGBT device Q6.

W-phase arm 17 includes series connected IGBT devices Q7 and Q8, and diodes D7 and D8 connected parallel to IGBT devices Q7 and Q8, respectively. Diode D7 has a cathode connected to a collector of IGBT device Q7, and an anode connected to an emitter of IGBT device Q7. Diode D8 has a cathode connected to a collector of IGBT device Q8, and an anode connected to an emitter of IGBT device Q8.

Each phase arm has an intermediate point connected to a phase end of a phase coil of motor generator M1. More specifically, motor generator M1 is a 3-phase, permanent magnet motor with three, U, V and W phase coils each having one end connected to a neutral point. The U-phase coil has the other end connected to a node connecting IGBT devices Q3 and Q4 together. The V-phase coil has the other end connected to a node connecting IGBT devices Q5 and Q6 together. The W-phase coil has the other end connected to a node connecting IGBT devices Q7 and Q8 together.

Current sensor 24 detects, as a motor current value MCRT1, a current flowing through motor generator MG1 and outputs motor current value MCRT1 to controller 30.

Power control unit 20 further includes an inverter 22 connected to up-converter 12 in a manner parallel with inverter 14, system main relays SMR4 and SMR5 connected to positive and negative output nodes, respectively, of up-converter 12, and a capacitor 23 storing power up-converted by up-converter 12.

Inverter 22 converts DC voltage output by up-converter 12 to a 3-phase AC current, and outputs the current to motor generator M2 driving wheel 2. Furthermore, inverter 22 returns to up-converter 12 the power generated by motor generator M2 as the vehicle is regeneratively braked. In doing so, up-converter 12 is controlled by controller 30 to operate as a down conversion circuit. Although not shown, inverter 22 has an internal configuration similar to inverter 14. Therefore the description thereof will not be repeated.

Controller 30 receives each value of torque control values TR1 and TR2, motor speeds MRN1 and MRN2, voltages VB and VH and current IB, motor current values MCRT1 and MCRT2, and a start signal IGON, and outputs a control signal PWU instructing up-converter 12 to provide up-conversion, and a control signal PWD instructing the converter to provide down conversion, and a signal CSDN instructing the converter to stop its operation.

Furthermore controller 30 outputs an instruction PWMI1 instructing inverter 14 to convert a DC voltage output from up-converter 12 to an AC voltage for driving motor generator M1, and an instruction PWMC1 instructing inverter 14 for regeneration to convert an AC voltage generated by motor generator M1 to a DC voltage and return the DC voltage to up-converter 12.

Similarly, controller 30 outputs an instruction PWMI2 instructing inverter 22 to convert a DC voltage to an AC voltage for driving motor generator M2, and an instruction PWMC2 instructing inverter 22 for regeneration to convert an AC voltage generated by motor generator M2 to a DC voltage and return the DC voltage to up-converter 12.

Capacitor 23 is a charge storage device larger in capacitance than smoothing capacitor C2 and for example includes a plurality of series connected, electric dual layer capacitors. Note that while an electric dual layer capacitor is high in energy density, it withstands approximately 2.5 to 2.7V per cell. As such, if it is used for a voltage of approximately 500V output by up-converter 12, it is necessary that the plurality of electric dual layer capacitors have their cells connected in series to cause each cell to share voltage.

Conventionally, smoothing capacitor C2 for example of several thousands μF, which is a capacitance sufficient to smooth ripple of voltage output from up-converter 12, alone is mounted. In parallel therewith, capacitor 23 having a capacitance for example of approximately 0.5-2.0 F is further mounted.

Thus if for example a vehicle running as an EV is rapidly accelerated to overtake another vehicle, the power with which motor generator M2 rotates wheel 2 is increased and furthermore in parallel therewith the power compensated for by capacitor 23 is used to rotate motor generator M1 to start engine 4, which in turn generates power added to that for acceleration. In other words, since capacitor 23 can provide an instant power output larger than battery B can, introducing capacitor 23 to supplement the battery B power can provide faster response for acceleration.

Figure 2:
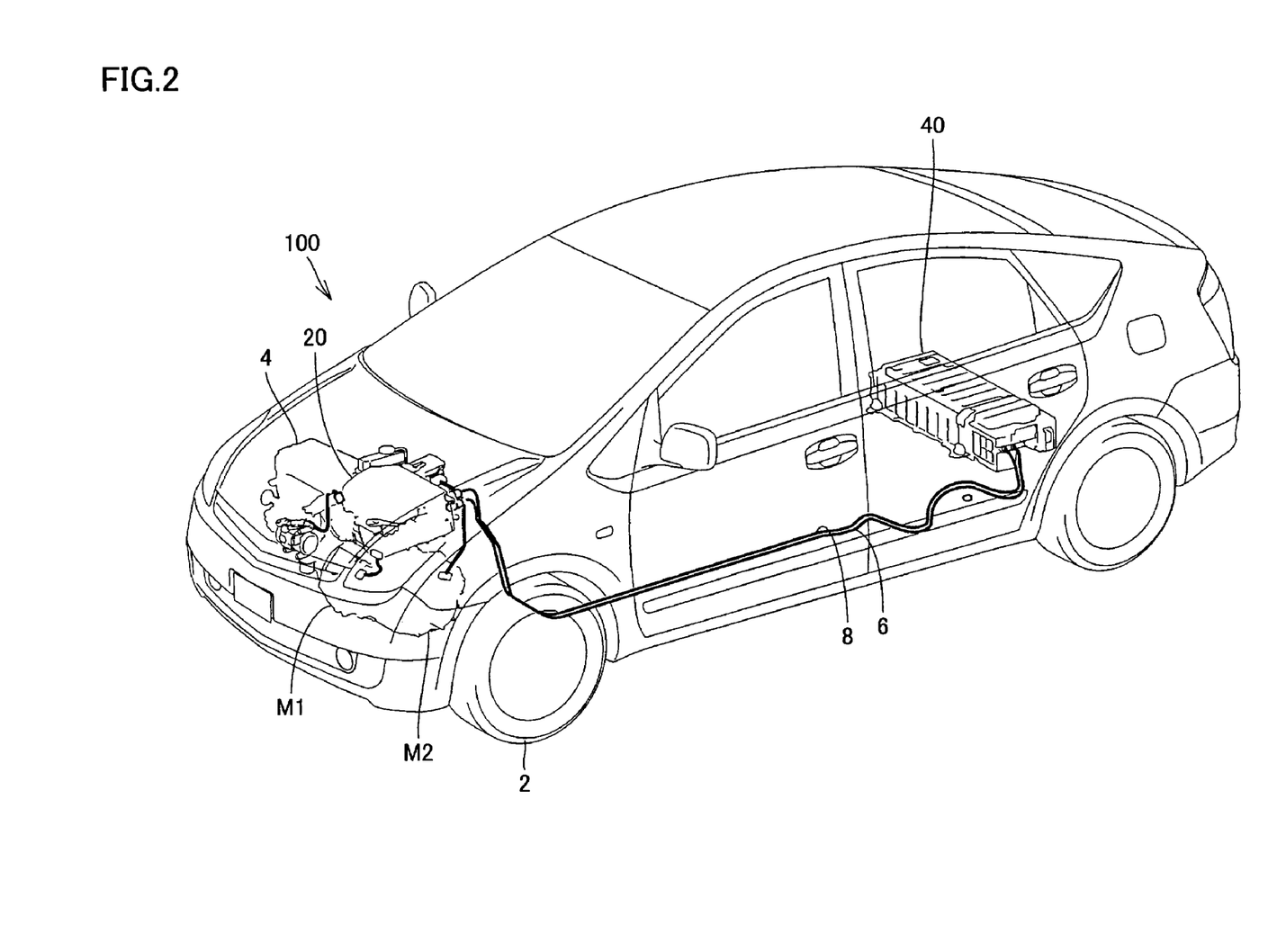
FIG. 2 illustrates where each unit described in FIG. 1 is located in a vehicle 100.

FIG. 2 is a diagram for illustrating where each unit described with reference to FIG. 1 is located in vehicle 100.

With reference to FIG. 2, battery unit 40 is located in a space behind the driver's seat, e.g., under a rear seat, in a trunk, or the like.

In contrast, power control unit 20, engine 4, and motor generators M1 ad M2 are located in a space in front of the driver's seat, e.g., in an engine room. Battery unit 40 located in a rear portion of the vehicle and power control unit 20 located in a front portion of the vehicle are connected by power cables 6 and 8.

As shown in FIG. 2, for the purpose of safety, battery unit 40 is housed in a single case to prevent a high voltage portion from being externally exposed, and system main relays are provided in a vicinity of an outlet of a terminal thereof, as shown in FIG. 1. When the vehicle experiences a collision or a similar accident, the system main relays are electrically disconnected to disconnect a high voltage from a power cable to prevent the high voltage from being externally output.

The configuration as shown in FIG. 1, however, has battery B, smoothing capacitors C1 and C2 and capacitor 23 connected by power cables 6 and 8 and thus remotely arranged. Accordingly the system main relays must be connected in a predetermined sequence. This is done for example to prevent the relays from being welded by a spark generated in connecting the relays by an undue inrush current for charging capacitor 23 and smoothing capacitors C1 and C2.

Figure 3:
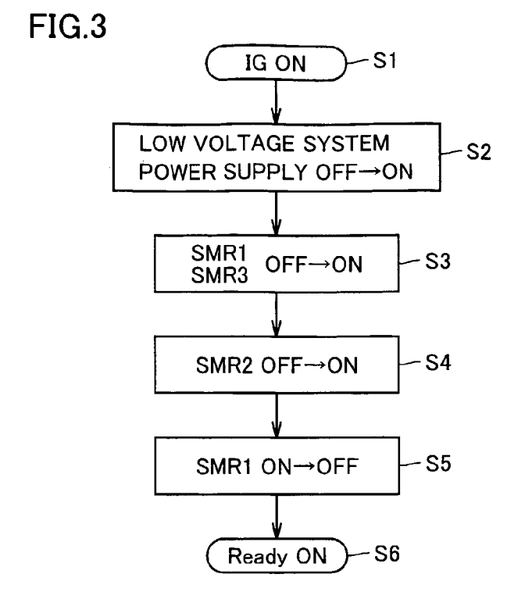

FIG. 3 is a flow chart of a sequence for controlling the system main relays when vehicle 100 of FIG. 1 is powered on.

With reference to FIG. 3, initially at step S1 the driver issues an instruction to start the vehicle and start signal IGON is activated. Then at step S2 a power supply voltage for a low voltage system of an accessory battery (e.g. of 12V) of the vehicle is supplied to a load circuit of the low voltage system including controller 30.

Then at step S3 controller 30 turns system main relays SMR1 and SMR3 from off to on. Thus smoothing capacitors C1 and C2 are charged via current-limiting resistor R shown in FIG. 1. In doing so, system main relays SMR4 and SMR5 may also previously be connected to charge capacitor 23.

A period of time elapses to allow smoothing capacitors C1 and C2 to have a voltage substantially equal to the battery's voltage and thereafter at step S4 system main relay SMR2 is turned from off to on. This allows system main relay SMR2 to connect a potential difference and a current that fall within a tolerable range. System main relay SMR2 can thus be prevented from being welded.

When step S4 completes, then at step S5 system main relay SMR1 is turned from on to off and at step S6 the vehicle transitions to a Ready On state allowing up-converter 12 to be drivable and inverters 14 and 22 to be operable.

Figure 4:
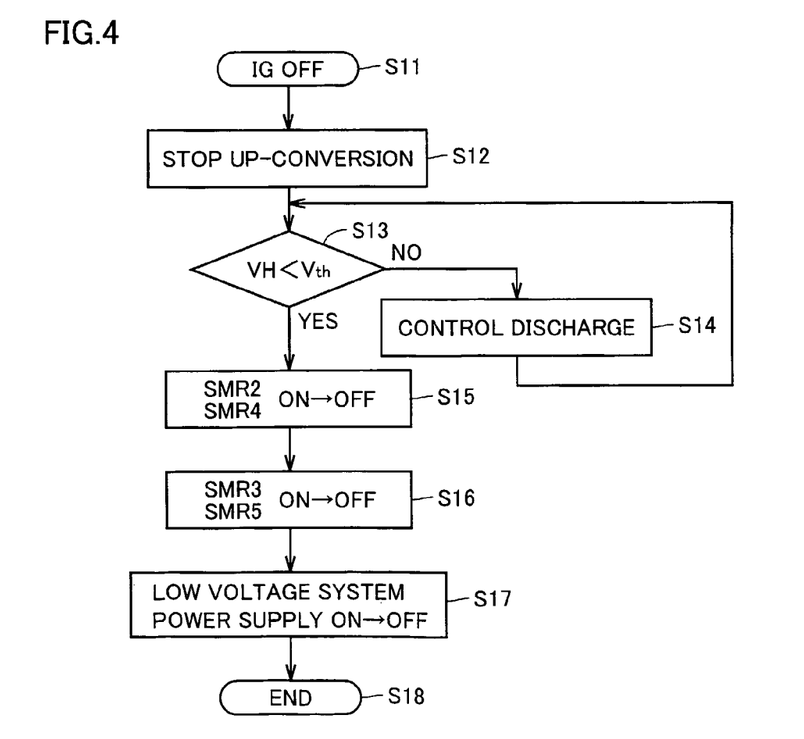
FIG. 4 is a flow chart representing how the system main relays are controlled when vehicle 100 of FIG. 1 is stopped.

FIG. 4 is a flow chart of controlling the system main relays when vehicle 100 of FIG. 1 is stopped.

With reference to FIGS. 1 and 4, initially at step S11 start signal IGON of FIG. 1 is inactivated for example by an instruction of the driver such as turning off an ignition or turning off a start switch.

At step S11 when start signal IGON is inactivated the process proceeds to step S12 and controller 30 stops up-converter 12 from operating to provide up-conversion. The process then proceeds to step S13.

At step S13 controller 30 determines whether voltage VH between the terminals of smoothing capacitor C2 is smaller than a predetermined threshold voltage Vth. If VH<Vth is not established the process proceeds to step S14 and controller 30 causes inverter 14 or 22 to perform a discharge operation.

The discharge operation is an operation exerting control to prevent a q axis current from flowing and allow a d axis current alone to flow to prevent motor generator M1 or M2 from having its rotor generating a torque, and allows electric charges stored in smoothing capacitor C2 and capacitor 23 to be consumed as heat. Alternatively in the discharge operation the stored charges may not be consumed as heat and may instead be moved to battery B and thus consumed. As the discharge operation is performed the stored charges are consumed and voltage VH thus decreases. When step S13 completes, the process returns to step S12 to again determine whether VH<Vth is established.

If at step S13 VH<Vth is established the process proceeds to step S15 and controller 30 turns system main relays SMR2 and SMR4 from on to off. The process then proceeds to step S16 and controller 30 turns system main relays SMR3 and SMR5 from on to off. When step S16 completes, the process proceeds to step S17 and the power supplied to a load of a low voltage system, such as controller 30 supplied with power for the low voltage system, is stopped and furthermore at step S18 the vehicle is stopped and waits for a subsequent start signal received from the driver.

Thus the example considered with reference to FIGS. 1-4 employs capacitor 23 to provide faster response for acceleration when a vehicle runs as an EV. However, it requires an increased number of system main relays and hence an increased number of components and controller 30 is accordingly required to exert complicated control.

Figure 5:
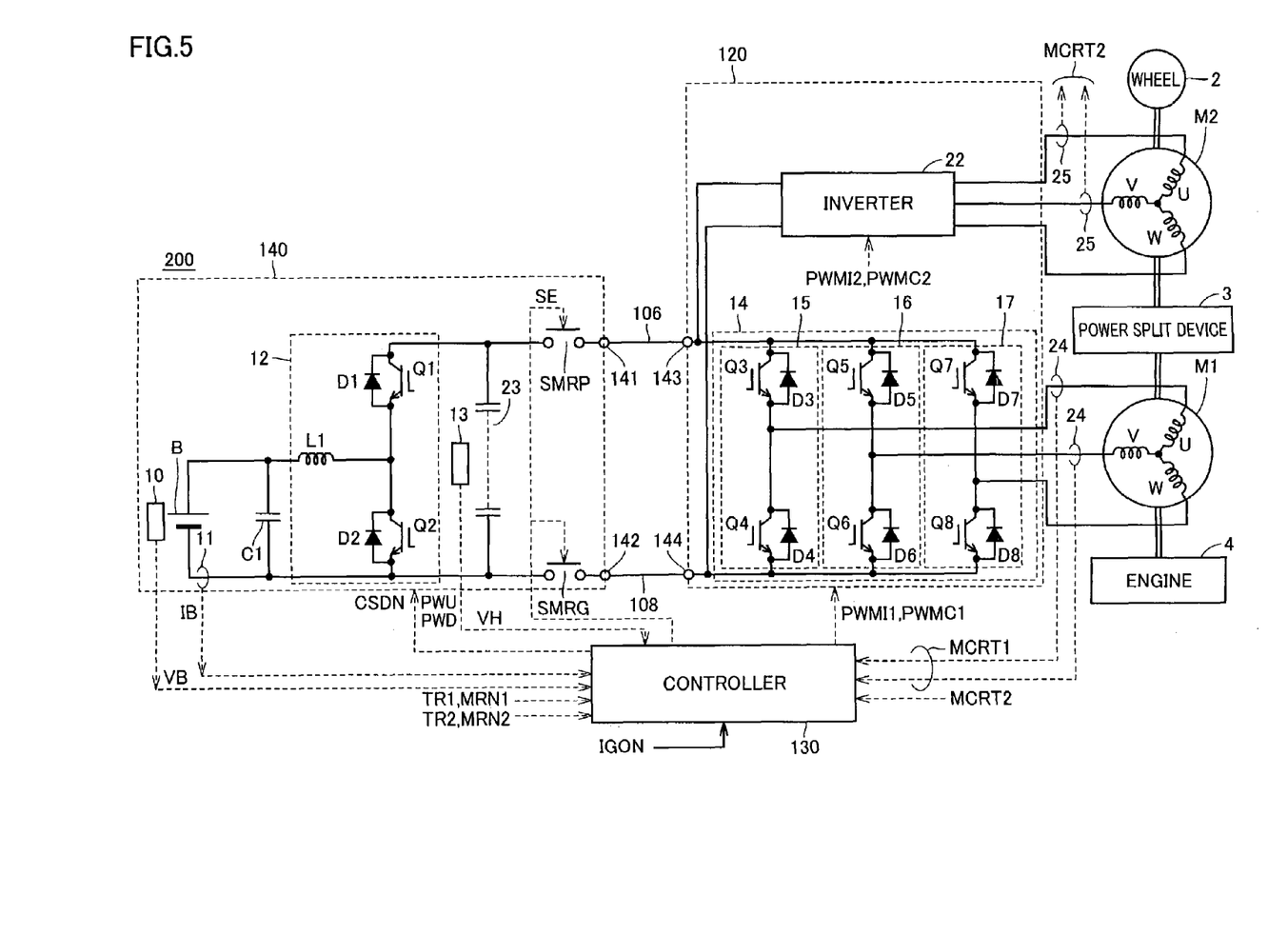
FIG. 5 is a circuit diagram showing a configuration of a vehicle 200 in an embodiment of the present invention.

FIG. 5 is a circuit diagram showing a configuration of a vehicle 200 in an embodiment of the present invention.

With reference to FIG. 5 vehicle 200 includes a DC power supply system 140 for supplying DC power, an inverter unit 120 receiving a DC voltage from DC power supply system 140 to convert the received DC voltage to a 3-phase AC current, motor generators M1 and M2 driven by inverter unit 120, engine 4, power split device 3, wheel 2, and a controller 130.

Motor generators M1 and M2, engine 4, power split device 3 and wheel 2 have a relationship similar to that described for the example considered with reference to FIG. 1. Therefore the description thereof will not be repeated.

DC power supply system 140 is provided with terminals 141 and 142. Furthermore inverter unit 120 is provided with terminals 143 and 144. Vehicle 200 further includes power a cable 106 connecting terminals 141 and 143 together, and a power cable 108 connecting terminals 142 and 144 together.

DC power supply system 140 includes battery B, smoothing capacitor C1 connected between terminals of battery B, up-converter 12 up-converting a voltage output from battery B, a capacitor 23 connected between output terminals of up-converter 12, a system main relay SMRP connected between a positive output terminal of up-converter 12 and terminal 141, and a system main relay SMRG connected between a negative output terminal of up-converter 12 and terminal 142.

DC power supply system 140 further includes voltage sensor 10 detecting voltage VB between the terminals of battery B, current sensor 11 detecting current IB flowing through battery B, and voltage sensor 13 detecting voltage VH between terminals of capacitor 23. Controller 130 receives, as measurements, voltages VB, VH and current IB detected by the sensors.

Inverter unit 120 includes inverter 14 converting the voltage up-converted by up-converter 12 to a 3-phase AC current and supplying the 3-phase AC current to motor generator M1, and inverter 22 converting the voltage up-converted by up-converter 12 to a 3-phase AC current and outputting the 3-phase AC current to motor generator M2.

Inverters 14 and 22 have a configuration similar to that described with reference to FIG. 1. Therefore the description thereof will not be repeated.

Controller 130 receives each value of torque control values TR1 and TR2, motor speeds MRN1 and MRN2, voltages VB and VH and current IB, motor current values MCRT1 and MCRT2, and start signal IGON, and outputs a control signal PWU instructing up-converter 12 to provide up-conversion, and a control signal PWD instructing the converter to provide down conversion, and a signal CSDN instructing the converter to stop its operation.

Furthermore controller 130 outputs an instruction PWMI1 instructing inverter 14 to convert a DC voltage output from up-converter 12 to an AC voltage for driving motor generator M1, and an instruction PWMC1 instructing inverter 14 for regeneration to convert an AC voltage generated by motor generator M1 to a DC voltage and return the DC voltage to up-converter 12.

Similarly, controller 130 outputs an instruction PWMI2 instructing inverter 22 to convert a DC voltage to an AC voltage for driving motor generator M2, and an instruction PWMC2 instructing inverter 22 for regeneration to convert an AC voltage generated by motor generator M2 to a DC voltage and return the DC voltage to up-converter 12.

Up-converter 12 operates, as will be briefly described hereinafter. Up-converter 12 in a parallel operation operates as an up-conversion circuit receiving power from battery B and supplying the power to inverters 14 and 22 and in a regenerative operation also operates as a down conversion circuit for regeneration, charging battery B with power generated by motor generator M1 or M2.

Figure 6:
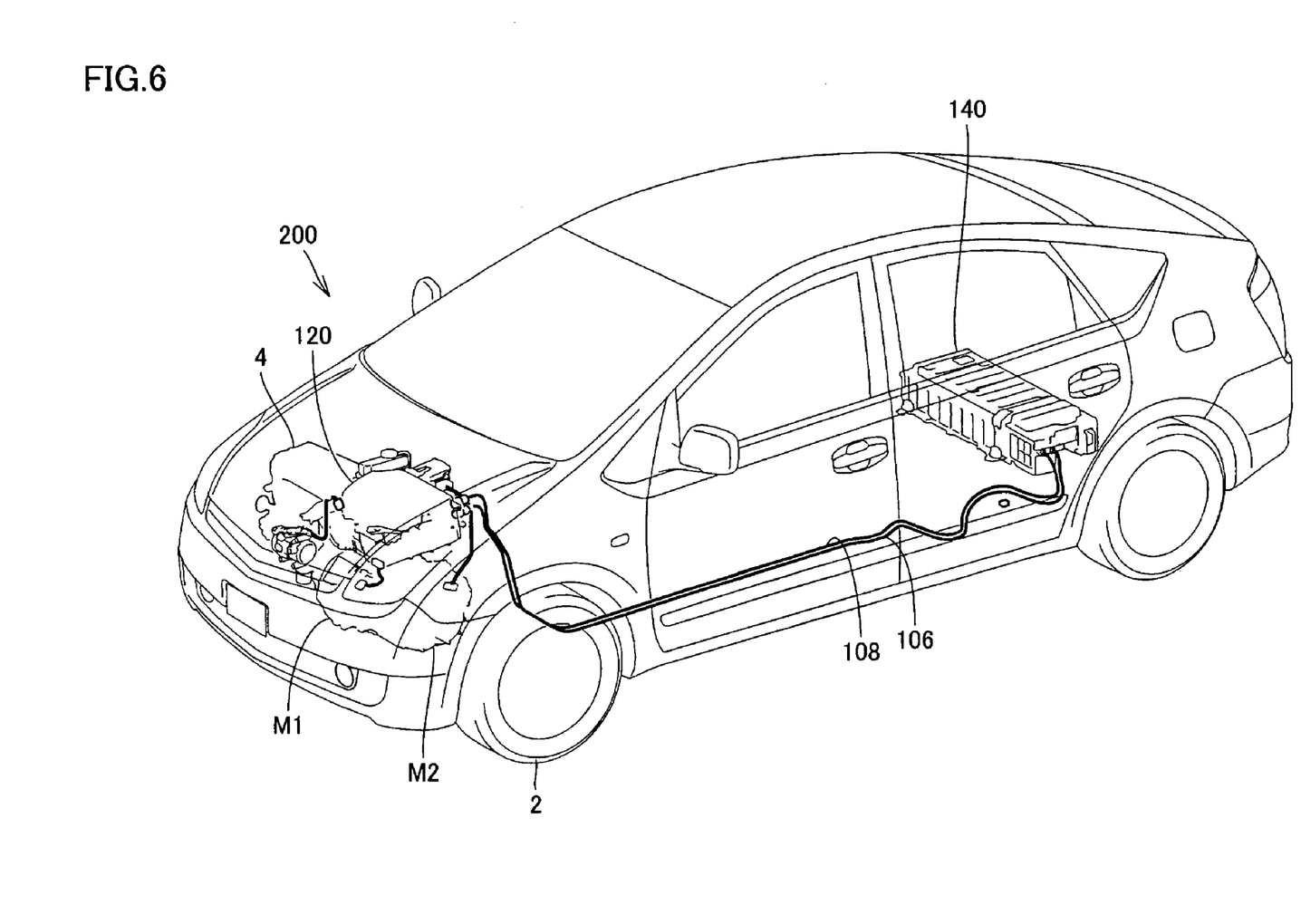
FIG. 6 shows where each unit described with reference to FIG. 5 is located in vehicle 200.

FIG. 6 is a diagram for illustrating where in vehicle 200 each unit described with reference to FIG. 5 is located.

With reference to FIG. 6, DC power supply system 140 is located in a space behind the driver's seat, e.g., under a rear seat, in a trunk, or the like.

In contrast, inverter unit 120, engine 4, and motor generators M1 ad M2 are located in a space in front of the driver's seat, e.g., in an engine room. DC power supply system 140 located in a rear portion of the vehicle and inverter unit 20 located in a front portion of the vehicle are connected by power cables 106 and 108.

As shown in FIG. 6, for the purpose of safety, DC power supply system 140 is housed in a single case to prevent a high voltage portion from being externally exposed, and system main relays SMRP and SMRG are provided in a vicinity of an outlet of a terminal thereof, as shown in FIG. 5. When the vehicle experiences a collision or a similar accident, system main relays SMRP and SMRG are both electrically disconnected to disconnect a high voltage from power cables 106 and 108 to prevent the high voltage from being externally output.

Figure 7:
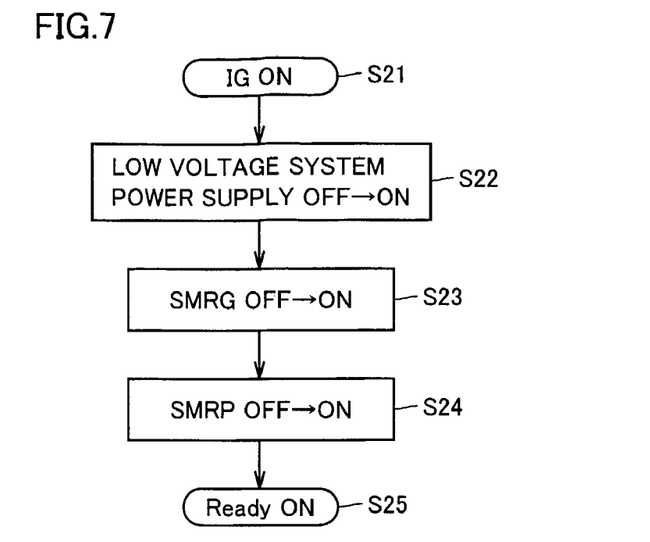
FIG. 7 is a flow chart of controlling system main relays when vehicle 200 is started.

FIG. 7 is a flow chart for illustrating how the system main relays are controlled when vehicle 200 is started.

With reference to FIG. 7 initially at step S21 the driver for example operates an ignition key or a start switch to activate start signal IGON. In response thereto, at step S22 an accessory battery of a low voltage (for example of 12 V) different from high-voltage battery B starts to supply power to a low voltage system power supply load.

Then at step S23 controller 130 causes system main relay SMRG associated with ground, which is electrically disconnected, to be electrically connected. The process then proceeds to step S24 and controller 130 causes system main relay SMRP associated with high voltage, which is electrically disconnected, to be electrically connected. Thus inverters 14 and 22 are supplied with power and then at step S25 inverters 14 and 22 and up-converter 12 attains an operable, Ready On state and a subsequent operation is awaited.

Since capacitor 23 is employed to also serve as smoothing capacitor C2 of FIG. 1 and incorporated at that side of the system main relays which is closer to battery B, an inrush current is prevented from flowing for charging the capacitor in starting the vehicle when the system main relays are connected. System main relay SMR1 and current-limiting resistor R of FIG. 1 can be dispensed with and as a result a simpler configuration and hence simpler control, as shown in FIG. 7, than that shown in FIG. 3 can be achieved.

Figure 8:
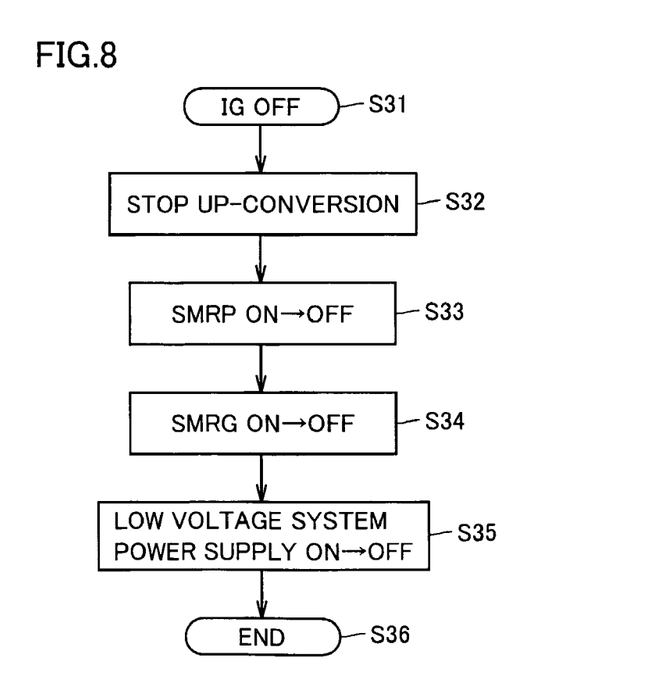
FIG. 8 is a flow chart of controlling relays when the vehicle is stopped.

FIG. 8 is a flow chart for illustrating how relays are controlled when the vehicle is stopped.

With reference to FIGS. 5 and 8, initially at step S31, the driver controls the ignition key or the start switch to inactivate start signal IGON. Then at step S32 controller 130 stops up-converter 12 from effecting an up-conversion operation.

Subsequently at step S33 controller 130 causes system main relay SMRP associated with high voltage, which is electrically connected, to be electrically disconnected. Furthermore at step S34 controller 130 causes system main relay SMRG associated with ground, which is electrically connected, to be electrically disconnected. Thereafter at step S35 the power supplied to the low voltage system load is stopped and furthermore at step S36 the vehicle is stopped and controller 130 waits for a subsequent instruction received from the driver to start the vehicle.

As compared with the control exerted to stop the vehicle in the example considered with reference to FIG. 4, it is not necessary to discharge capacitor 23 whenever the vehicle is stopped. The vehicle can thus be controlled in a simplified manner.

Furthermore if the vehicle is used in such a manner that it is frequently repeatedly started and stopped, the power corresponding to an electric charge stored in capacitor 23 in particular is not forced to be discharged, and lost and transformed into heat. The vehicle can be enhanced in mileage.

When the vehicle is stopped for a long period of time, capacitor 23 gradually decreases in voltage between its terminals as its self discharge is in general larger than that of battery B. If the voltage of capacitor 23 between the terminals decreases to be smaller than that of battery B, however, capacitor 23 is supplied and thus charged with a current from battery B through reactor L1 and diode D1. Thus the voltage of capacitor 23 attains a steady state in a state substantially equal to the voltage of battery B.

As has been described above, the present invention in embodiment provides a DC power supply system with a converter, a capacitor and the like incorporated in a case and thus packed in one. This can provide a reduced number of system main relays and eliminate the necessity of using a current-limiting resistor. This accordingly allows a controller to exert simplified control and also have a reduced load.

Furthermore, a capacitor larger in capacitance than a smoothing capacitor can be provided at an output of a converter. Faster response for rapid acceleration can be achieved.

Furthermore, a capacitor, a smoothing capacitor and the like housed in the case are not discharged whenever the vehicle is stopped. Increased mileage can thus be achieved.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A vehicular power system comprising:
a secondary battery;
a voltage converter receiving a voltage of said secondary battery at a first connection node thereof, and up-converting a voltage between terminals of said secondary battery and outputting the up-converted voltage at a second connection node thereof;
a connection unit switching between connection and disconnection of the voltage up-converted by said voltage converter to and from a load of a vehicle; and
a case housing said secondary battery, said voltage converter and said connection unit.

2. The vehicular power supply system according to claim 1, further comprising a capacitor having one end connected to said second connection node of said voltage converter, wherein said case further houses said capacitor.

3. The vehicular power supply system according to claim 2, wherein said capacitor includes a plurality of series connected, electric dual layer capacitors.

4. The vehicular power supply system according to claim 1, wherein said voltage converter includes a reactor and a switching device connected in series on a path extending from said first connection node to said second connection node.

5. The vehicular power supply system according to claim 1, further comprising a smoothing capacitor connected between said terminals of said secondary battery, wherein said case further houses said smoothing capacitor.

6. The vehicular power supply system according to claim 1, further comprising:
a first terminal provided at said case and connected to a first electrically conductive line supplying said load of said vehicle with electric power; and
a second terminal provided at said case and connected to a second electrically conductive line serving as a return line of said first electrically conductive line, wherein
said connection unit includes a first relay circuit connecting a second node of said voltage converter to said first terminal, and a second relay circuit connecting a ground node of said voltage converter to said second terminal.

7. A vehicle comprising:
a vehicular power supply system including
a secondary battery,
a voltage converter receiving a voltage of said secondary battery at a first connection node thereof, and up-converting a voltage between terminals of said secondary battery and outputting the up-converted voltage at a second connection node thereof,
a connection unit switching between connection and disconnection of the voltage up-converted by said voltage converter to and from a load of said vehicle, and
a case housing said secondary battery, said voltage converter and said connection unit;
a load of said vehicle supplied with power from said vehicular power supply system; and
a power cable connecting said vehicular power supply system and said load of said vehicle together.

8. The vehicle according to claim 7, wherein:
said vehicular power supply system is arranged in one of a space located in front of a driver's seat and a space located behind the driver's seat;
said load of said vehicle is arranged in the other of said spaces located in front of and behind the driver's seat; and
said power cable extends between said spaces in front of and behind the driver's seat.

9. The vehicle according to claim 7, wherein:
said vehicular power supply system further includes a capacitor having one end connected to said second connection node of said voltage converter; and
said case further houses said capacitor.

10. The vehicle according to claim 9, wherein said capacitor includes a plurality of series connected, electric dual layer capacitors.

11. The vehicle according to claim 7, wherein said voltage converter includes a reactor and a switching device connected in series on a path extending from said first connection node to said second connection node.

12. The vehicle according to claim 7, wherein:
said vehicular power supply system further includes a smoothing capacitor connected between said terminals of said secondary battery; and
said case further houses said smoothing capacitor.

13. The vehicle according to claim 7, wherein:
said vehicular power supply system further includes a first terminal provided at said case and connected to a first electrically conductive line supplying said load of said vehicle with electric power, and a second terminal provided at said case and connected to a second electrically conductive line serving as a return line of said first electrically conductive line; and said connection unit includes a first relay circuit connecting a second node of said voltage converter to said first terminal, and a second relay circuit connecting a ground node of said voltage converter to said second terminal.

* * * * *